(12) United States Patent
Sawant et al.

(10) Patent No.: US 10,120,995 B2
(45) Date of Patent: Nov. 6, 2018

(54) PATTERN PASSWORD WITH VARIABLE HINT PATTERN

(71) Applicant: CA, Inc., New York, NY (US)

(72) Inventors: Yashwant Ramkishan Sawant, Parbhani (IN); Mohammed Mujeeb Kaladgi, Bangalore (IN); Ruqiya Nikhat Kaladgi, Banglore (IN); Junaid Ahmed Jameel, Bangalore (IN); Jameel Ahmed Kaladgi, Bangalore (IN)

(73) Assignee: CA, Inc., New York, NY (US)

( * ) Notice: Subject to any disclaimer, the term of this patent is extended or adjusted under 35 U.S.C. 154(b) by 162 days.

(21) Appl. No.: 14/978,104

(22) Filed: Dec. 22, 2015

(65) Prior Publication Data

US 2017/0177851 A1    Jun. 22, 2017

(51) Int. Cl.
  *G06F 21/36* (2013.01)

(52) U.S. Cl.
  CPC ..................... *G06F 21/36* (2013.01)

(58) Field of Classification Search
  CPC .................. G06F 12/36; G06F 7/588
  See application file for complete search history.

(56) References Cited

U.S. PATENT DOCUMENTS

| 5,559,961 A * | 9/1996 | Blonder | G07C 9/00142 726/18 |
| 6,434,702 B1 | 8/2002 | Maddalozzo, Jr. et al. | |
| 7,444,517 B2 * | 10/2008 | Dayan | G06F 21/31 713/182 |
| 7,536,556 B2 | 5/2009 | Fedorova et al. | |
| 7,593,000 B1 | 9/2009 | Chin | |
| 8,881,251 B1 * | 11/2014 | Hilger | H04L 63/083 713/183 |
| 9,117,068 B1 * | 8/2015 | Zhang | G06F 21/36 |
| 9,189,614 B2 * | 11/2015 | DeLuca | G06F 3/0488 |
| 9,230,086 B2 * | 1/2016 | Lee | G06F 3/0488 |
| 9,626,499 B2 * | 4/2017 | Kuscher | G06F 21/36 |
| 2004/0093527 A1 * | 5/2004 | Pering | G06F 21/36 726/5 |

(Continued)

FOREIGN PATENT DOCUMENTS

CN    103024142 A    4/2013

*Primary Examiner* — Michael Simitoski
*Assistant Examiner* — Vance M Little
(74) *Attorney, Agent, or Firm* — Gilliam IP PLLC (57) ABSTRACT

A device unlock pattern ("pattern password") is static in that the same pattern is entered each time to unlock a device. Due to this repetition, a pattern password may be discovered by an application that captures touchscreen gestures, by inspection of fingerprints or smudges on a screen, or simply by an onlooker that views the pattern password being entered. A variable hint pattern can be used to impede discovery. A hint pattern is a sub-pattern ("hint") of the pattern password to be completed for device unlock. A variable hint pattern can impede discovery by changing the sub-pattern at a defined change threshold related to unlock attempts. The device can randomly change the sub-pattern or randomly change the missing portions of the pattern password at each change threshold. As a result, different inputs complete the pattern password. This variance stymies the methods typically used to discover pattern passwords.

20 Claims, 5 Drawing Sheets (56) References Cited

U.S. PATENT DOCUMENTS

| | | | |
|---|---|---|---|
| 2008/0168546 A1* | 7/2008 | Almeida | G06F 21/41 |
| | | | 726/6 |
| 2012/0252410 A1* | 10/2012 | Williams | G06F 21/36 |
| | | | 455/411 |
| 2013/0031640 A1* | 1/2013 | Fisk | G06F 21/36 |
| | | | 726/28 |
| 2013/0229367 A1 | 9/2013 | Pinch | |
| 2014/0317723 A1* | 10/2014 | Hicks | G06F 21/36 |
| | | | 726/19 |
| 2015/0242613 A1* | 8/2015 | Kuscher | G06F 3/16 |
| | | | 726/19 |
| 2016/0055329 A1* | 2/2016 | Akula | G06F 21/36 |
| | | | 726/7 |
| 2016/0202881 A1* | 7/2016 | Ahmad | G06F 3/04842 |
| | | | 715/835 |

\* cited by examiner

PATTERN PASSWORD WITH VARIABLE HINT PATTERN

BACKGROUND

The disclosure generally relates to the field of computer systems, and more particularly to pattern based security for mobile devices.

Mobile devices employ various security mechanisms such as passwords, personal identification numbers, fingerprints, etc., to determine whether a user is authorized to access the device. Mobile devices may also allow a user to access or unlock a device using a particular finger gesture or tracing a pre-defined pattern password on a grid.

BRIEF DESCRIPTION OF THE DRAWINGS

Embodiments of the disclosure may be better understood by referencing the accompanying drawings.

DESCRIPTION

The description that follows includes example systems, methods, techniques, and program flows that embody aspects of the disclosure. However, it is understood that this disclosure may be practiced without these specific details. For instance, this disclosure refers to mobile devices in illustrative examples. But aspects of this disclosure can be applied to computer systems in general such as desktop computers, laptop computers, tablets, etc. In other instances, well-known instruction instances, protocols, structures and techniques have not been shown in detail in order not to obfuscate the description.

Overview

A device unlock pattern ("pattern password") is static in that the same pattern is entered each time to unlock a device. Due to this repetition, a pattern password may be discovered. As examples, a pattern password could be discovered by an application that captures touchscreen gestures, by inspection of fingerprints or smudges on a screen, or simply by an onlooker that views the pattern password being entered. A variable hint pattern can be used to impede discovery. A hint pattern is a sub-pattern ("hint") of the pattern password to be completed for device unlock. A variable hint pattern can impede discovery by changing the sub-pattern at a defined change threshold related to unlock attempts (e.g., every n attempts to unlock a device, with n being >=1). The device can randomly change the sub-pattern or randomly change the missing portions of the pattern password at each change threshold. As a result, different inputs complete the pattern password. This variance stymies the methods typically used to discover pattern passwords.

Example Illustrations

Figure 1:
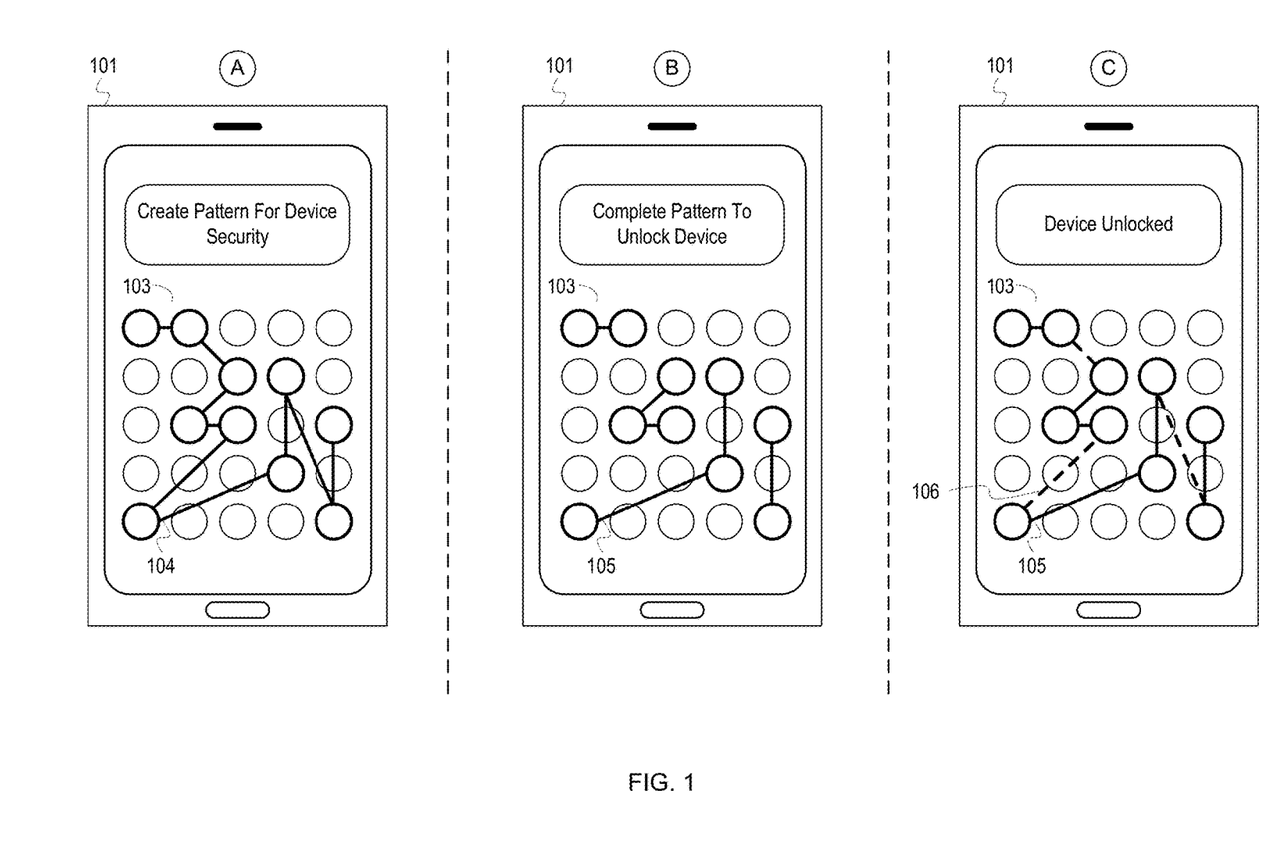
FIG. 1 depicts an example device that implements a variable hint pattern.

FIG. 1 depicts an example device that implements a variable hint pattern. FIG. 1 depicts a device 101. The device 101 may be a mobile device such as a phone, tablet, smartwatch, etc. The device 101 includes a touchscreen display or other type of display capable of receiving user input. FIG. 1 is annotated with a series of letters A-C. These letters represent stages of operations. Although these stages are ordered for this example, the stages illustrate one example to aid in understanding this disclosure and should not be used to limit the claims. Subject matter falling within the scope of the claims can vary with respect to the order and some of the operations.

At stage A, the device 101 displays a grid 103 to allow a pattern password 104 to be configured. The grid 103 as depicted in FIG. 1 comprises twenty-five positions, which are represented by circles, to define a pattern password. The device associates each position with coordinates for display. The number of positions in the grid 103 can vary. For example, the grid 103 may contain sixteen positions. Additionally, an interface for defining and accepting a pattern password can be different with respect to the arrangement and orientation of pattern password defining positions. For example, the interface may present a triangular shape, or the interface may be periodically rotated, flipped, or otherwise modified. The level of security may be adjusted by increasing or reducing density of the grid 103.

A user can configure the pattern password 104 by tracing a pattern on the grid 103. The pattern password 104 consists of a series of line segments; however, other pattern passwords may include a collection of other types of graphical elements such as two-dimensional shapes, icons, etc. The device 101 may impose requirements on the pattern password 104 such as a minimum number of elements or avoiding commonly used patterns. Once the pattern password 104 is configured, the device 101 stores the pattern password 104 in persistent memory or other storage for future use. The device 101 may store the pattern password 104 as a set of coordinate pairs for the grid 103. For example, assuming the top left coordinate of the grid 103 is (0, 0), the first coordinate pair of the pattern password 104 may be [(0, 0), (1, 0)] and the second coordinate pair is [(1, 0), (2, 1)]. If the pattern password 104 is a continuous series of segments, the device 101 may simplify storage of the pattern password 104 to a series of coordinates, for example [(0, 0), (1, 0), (2, 1), (1, 2)] for the first four segments. The device 101 may encrypt or otherwise secure the pattern password 104 before storing.

At stage B, the device 101 displays a hint pattern 105 in response to the user indicating that he/she wishes to unlock the device 101. The device 101 or program code of the device 101 generates the hint pattern 105 by randomly selecting a subset of segments from the pattern password 104. As depicted in FIG. 1, the device 101 has selected six segments from the pattern password 104 to generate the hint pattern 105. The number of segments selected from the pattern password 104 may be determined randomly and may change with each unlock attempt. Since the selection and number of segments are randomly determined, the hint pattern 105 will likely be different for each unlock attempt.

At stage C, the device 101 receives inputs 106 from the user attempting to unlock the device 101 and authenticates the inputs 106. In FIG. 1, the inputs 106 include the three dashed line segments. The user may input the inputs 106 by tracing the various coordinates of the grid 103, tapping coordinates to form a segment, etc. The device 101 authenticates the inputs 106 by comparing the coordinate pairs of the inputs 106 to the coordinate pairs of segments of the pattern password 104 missing from the hint pattern 105. Alternatively, the device 101 may combine the segments of the hint pattern 105 with the inputs 106 and determine if the combination correctly forms the pattern password 104. If the inputs 106 correctly complete the hint pattern 105 to form the pattern password 104, the device 101 unlocks or allows a user access to the device. As depicted in FIG. 1, the inputs 106 correctly complete the hint pattern 105 to form the pattern password 104. As a result, the device 101 unlocks.

Figure 2:
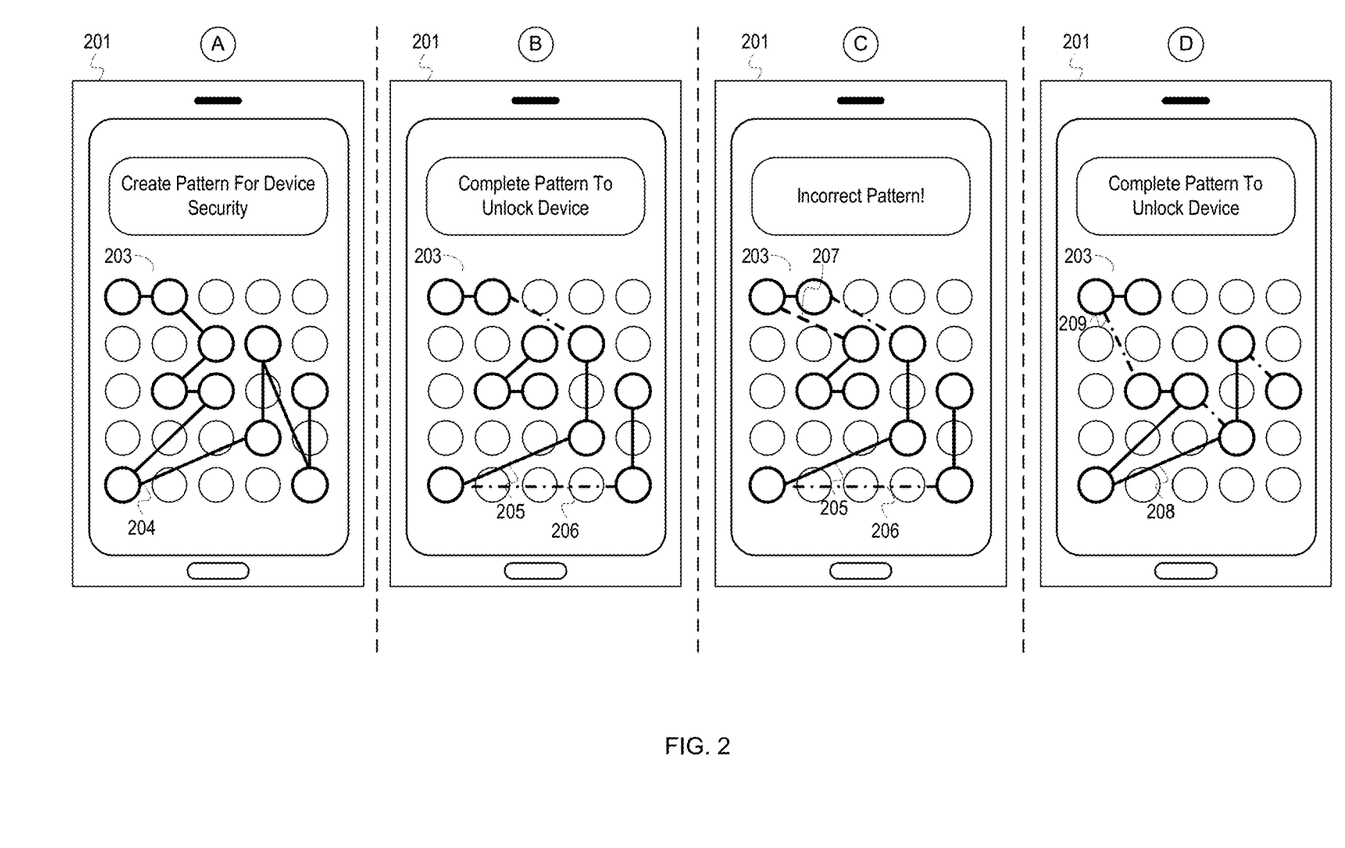
FIG. 2 depicts an example device that implements a variable hint pattern with distraction elements.

FIG. 2 depicts an example device that implements a variable hint pattern with distraction elements. FIG. 2 depicts a device 201. The device 201 may be a mobile device such as a phone, tablet, smartwatch, etc. The device 201 includes a touchscreen display or other type of display capable of receiving user input. FIG. 2 is annotated with a series of letters A-D. These letters represent stages of operations. Although these stages are ordered for this example, the stages illustrate one example to aid in understanding this disclosure and should not be used to limit the claims. Subject matter falling within the scope of the claims can vary with respect to the order and some of the operations.

At stage A, the device 201 displays a grid 203 to allow a pattern password 204 to be configured. The pattern password 204 is configured in a manner similar to that of the pattern password 104 as described at stage A of FIG. 1.

At stage B, the device 201 displays a hint pattern 205 and distraction segments 206 in response to a user indicating that he/she wishes to unlock the device 201. The device 201 or program code of the device 201 generates and displays the hint pattern 205 in a manner similar to that described at stage B of FIG. 1. In FIG. 2, the device 201 also generates and displays the distraction segments 206. The distraction segments 206 are segments that are not part of the pattern password 204 but serve to distract or mislead someone attempting to enter the pattern password 204. The distraction segments 206 are depicted in FIG. 2 using the dash dot line pattern so that the distraction segments 206 may be distinguished from the lines of the hint pattern 205 for illustration purposes. In an actual implementation, the distraction segments 206 are displayed in a similar manner to the hint pattern 205 so that someone unfamiliar with the pattern password 204 might believe the distraction segments 206 are part of the pattern password 204 or hint pattern 205, thereby increasing the difficulty of determining the pattern password 204 and gaining unauthorized access to the device 201. In implementations where the pattern password 204 includes graphical elements besides segments, such as two-dimensional shapes, the distraction segments 206 may include duplicates or modifications of the graphical elements to similarly distract a user.

The device 201 may determine the distraction segments 206 by randomly selecting coordinate pairs from the grid 203. In some implementations, the device 201 may randomly select coordinates from segments of the pattern password 204 to be used as coordinate pairs for the distraction segments 206. In FIG. 2, one of the distraction segments 206 has the coordinate pair [(1, 0), (4, 1)], assuming the top left corner of the grid 203 is the origin. The device 201 may have determined this distraction line by selecting the coordinate (1, 0) from the coordinate pair [(0, 0), (1, 0)] of the pattern password 204 and by selecting the coordinate (4, 1) from the coordinate pair [(4, 1), (4, 3)] of the pattern password 204. The device 201 may be configured to display a fixed number of the distraction segments 206 each time the hint pattern 205 is displayed or may randomly determine a number of distraction segments 206 to display. When determining distraction segments 206, the device 201 ensures that none of the determined distraction segments 206 match segments of the pattern password 204. Otherwise, one the distraction segments 206 may make it appear as if a segment of the pattern password 204 is already completed.

At stage C, the device 201 receives input 207 from the user attempting to unlock the device 201 and authenticates the input 207. In FIG. 2, the input 207 includes the dashed line segment with coordinate pair [(0, 0), (3, 1)]. The device 201 authenticates the input 207 by determining whether the input 207 correctly completed the hint pattern 205 to form the pattern password 204. The device 207 may make this determination by comparing the coordinates of the input 207 to the coordinates of the segments missing from the pattern password 204. When determining whether the hint pattern 205 was successfully completed, the device 201 ignores the distraction segments 206 as these are used to distract the user and are not part of the hint pattern 205 or the input 207. As depicted in FIG. 2, the input 207 does not correctly complete the hint pattern 205 to form the pattern password 204. As a result, the device 201 does not unlock and indicates that the user did not correctly complete the hint pattern 205.

The device 201 may respond to an unsuccessful unlock attempt in a number of ways. The device 201 may simply redisplay the hint pattern 205 with the distraction segments 206 and allow the user another chance to correctly complete the hint pattern 205. Alternatively, the device 201 may determine a different hint pattern than the hint pattern 205 and determine different distraction segments to be displayed. The device 201 may track the number of unsuccessful unlock attempts and react differently depending on the number of attempts. For example, if a maximum number of allowed attempts has been reached, the device 201 may lock and not allow additional unlock attempts for a period of time. Additionally, the device 201 may increase the difficulty of unlocking the device 201 by reducing the number of segments supplied in the hint pattern 205 after each unsuccessful unlock attempt. For example, the hint pattern 205 may include six line segments of the pattern password 204 for a first attempt as depicted in FIG. 2. For a second attempt, the device 201 may determine a different hint pattern that includes just five line segments of the pattern password 204. In this way, the hint pattern decays after each unlock attempt. The device 201 may also increase the difficulty of unlocking the device 201 by increasing the number of distraction segments. For example, two distraction segments may be displayed for a first attempt and three distraction segments may be displayed for a second attempt.

At stage D, the device 201 responds to the unsuccessful unlock attempt at stage C by displaying a hint pattern 208. The device 201 has implemented pattern decay and reduced the number of segments in the hint pattern 208. As depicted in FIG. 2, the hint pattern 205 included six segments and the hint pattern 208 includes five segments. In some implementations, the device 201 may take the segments of the hint pattern 205 and randomly remove one to form the hint pattern 208. The device 201 also determined new distraction segments 209. The device 201 determines the distraction segments 209 in a manner similar to the distraction segments 206; however, the device 201 has increased the number of distraction segments to three.

In addition to tracking the number of unlock attempts in a single series of attempts, the device 201 may track a number of unlock attempts over a period of use of the device 201 to determine user behavior. For example, the device 201 may track that on average a user requires four attempts to successfully complete the hint pattern 205 and unlock the device 201. In response to the high average of attempts, the device 201 may make the hint pattern 205 easier to complete by including more segments from the pattern password 204.

Additionally, the device 201 may reduce the number of distraction segments 206. For example, if the device 201 typically includes five segments in the hint pattern 205 and two segments as distraction segments 206, the device 201 may increase the number of segments in the hint pattern 205 to six and decrease the number of distraction segments 206 to one. The device 201 may also adjust a maximum number of allowed attempts based on user behavior. For example, if the user has never required more than three attempts to unlock the device 201, the device may set the maximum number of allowed attempts to three.

Figure 3:
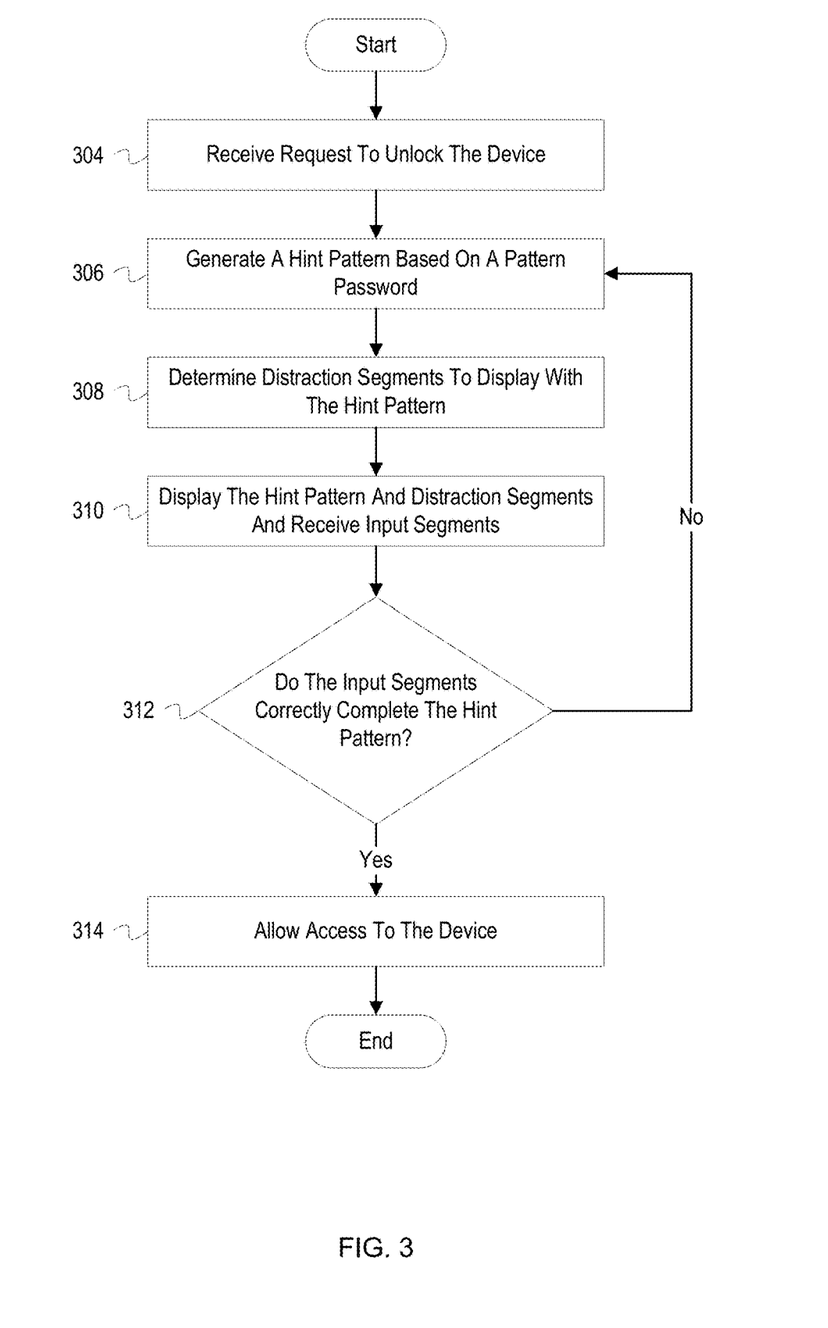
FIG. 3 depicts example operations for securing a device with a variable hint pattern.

FIG. 3 depicts example operations for securing a device with a variable hint pattern. The operations described in FIG. 3 are described as being performed by a device, such as the device 101 depicted in FIG. 1.

Prior to the operations described in FIG. 3, a device allows a user to configure a pattern password for the device. The device may display a grid and allow a user to trace a pattern to be used as the pattern password. In instances where the device does not include a touchscreen, the user may enter a pattern by drawing a pattern with a mouse or other mechanical input such as a keyboard, touchpad, etc. For example, the user may use the arrows on a keyboard to highlight and select coordinates on the grid to input line segments for the pattern. In some implementations, the device may not display a grid and may allow a user to draw a shape freehand. In such implementations, the device may record the display pixel coordinates of begin and end points of segments or may snap portions of the shape to points on a screen. In other implementations, the device may automatically determine the pattern password and display the pattern password to the user. Pattern password configuration can also allow for specification (or modification) of parameters of the pattern password. As examples, parameters can be defined for a minimum number of graphical elements to form a pattern password, a minimum complexity for a pattern password (e.g., color scale based complexity for pattern passwords that employ colors, coordinate based distribution, contrast between regions of the pattern password, etc.), a maximum complexity, similarity to previously used pattern passwords, etc.

The device receives a request to unlock the device (304). The device may receive a request to unlock the device as input from a button on the device being pressed, as input from a separate input device (e.g., a keyboard), as input via a touchscreen of the device, etc. Additionally, the unlock request may be directed toward a particular application or software running on the device.

The device generates a hint pattern based on the pattern password (306). As described and illustrated in FIGS. 1 and 2, the pattern password comprises a set of segments that form a pattern or shape. The hint pattern includes a subset of the segments in the pattern password. The segments included in the hint pattern may be randomly selected from the pattern password. Conversely, the device may randomly determine segments of the pattern password to be excluded from the hint pattern. The hint pattern then comprises the remaining segments. For example, if the pattern password is stored as a series of coordinate pairs that indicate segments, the device may randomly exclude the second, third, and fifth coordinate pairs. If the pattern password includes a set of five line segments, the hint pattern would only include two line segments, those indicated by the second and fourth coordinate pairs. The number of segments excluded from the pattern password may also be randomly generated or randomly selected from a range of numbers. For example, if the pattern password includes a set of ten line segments, the device may be configured to select a number of line segments to remove from a range of four to eight. Similarly, the number of segments to select from the pattern password for the hint pattern may be randomly generated or randomly selected from a range of numbers. The device may store the coordinate pairs of the generated hint pattern. Alternatively, the device may store identifiers or coordinate pairs for the segments of the pattern password excluded from the hint pattern so that the excluded segments may later be compared to user input segments. Although the determination of the hint pattern may be influenced by randomness (or pseudo-randomness), some parameters can be specified to influence the chosen hint pattern. For instance, a floor and/or ceiling can be specified for the extent of the variable hint pattern. To illustrate, a floor parameter can be specified that sets a minimum number of elements to form the hint pattern and a ceiling parameter can be specified that sets a maximum number of elements from the pattern password to form the hint pattern.

The device determines distraction segments to display with the hint pattern (308). The distraction segments are segments that are not part of the set of segments which comprise the pattern password but serve as a distraction to someone completing the hint pattern. The device may randomly determine a number of and coordinate pairs for distraction segments. In some implementations, the device may randomly select coordinates from different coordinate pairs included in the pattern password. For example, the pattern password may include two coordinate pairs {[(0, 0), (3, 2)], [(3, 2), (4, 5)]}. The device may randomly select the coordinates (0, 0) and (4, 5) to be a distraction segment. After determining coordinate pairs for the distraction segments, the device may ensure that the coordinate pairs of the distraction segments do not match any of the coordinate pairs of the pattern password.

The device displays the hint pattern and distraction segments and receives input segments (310). The device displays on the grid the segments that comprise the hint pattern and the distraction segments. The device then receives input from the user which should be a number of segments. If the device determines that the user input does not comprise segments, i.e. the input does not properly connect grid coordinates, the device may indicate that the user input is invalid and request additional, valid user input. The device may determine the segments input by the user by determining the coordinates which were connected by the user input.

The device determines whether the input segments correctly complete the hint pattern (312). The input segments combined with the segments of the hint pattern should be identical to the pattern password. To determine whether the input segments properly complete the hint pattern, the device may combine the coordinate pairs of the hint pattern and the coordinate pairs of the user input segments. The device may then determine whether the resulting combination of coordinate pairs matches the coordinate pairs of the pattern password. Alternatively, if the device stored the coordinate pairs for the line segments that were excluded from the pattern password at block 306, the device may compare the coordinate pairs to the coordinate pairs for the input segments.

If the input segments do not correctly complete the hint pattern, the device generates another hint pattern (306). The device may randomly generate hint pattern for each unlock attempt or request. As a result, different input segments may be required each time to complete the hint pattern. This increases security by not allowing the user to have multiple attempts to complete the same hint pattern. The device may ensure that a newly generated hint pattern is not identical to a previously displayed hint pattern by comparing segments between the hint patterns. If the hint patterns are identical or if a newly generated hint pattern is merely a subset of the previous hint pattern, the device may randomly generate a different hint pattern.

If the input segments correctly complete the hint pattern, the device allows access or unlocks (314). In response to successfully matching the pattern password, the device may allow access to data or software on the device.

In the descriptions of FIGS. 1, 2, and 3, a user establishes a pattern password to protect a device. In the FIG. 4 description, a user establishes a traditional password to protect a device. The letters of the password are displayed on a grid along with other letters that are not part of the password. A user unlocks the device by successfully selecting or tracing the letters of the password in sequence. The letters are scrambled or repositioned on the grid for each unlock attempt. In this way, the traditional password, similar to the pattern password, requires different user input for each unlock attempt and, therefore, similarly reduces the chances of discovery.

Figure 4:
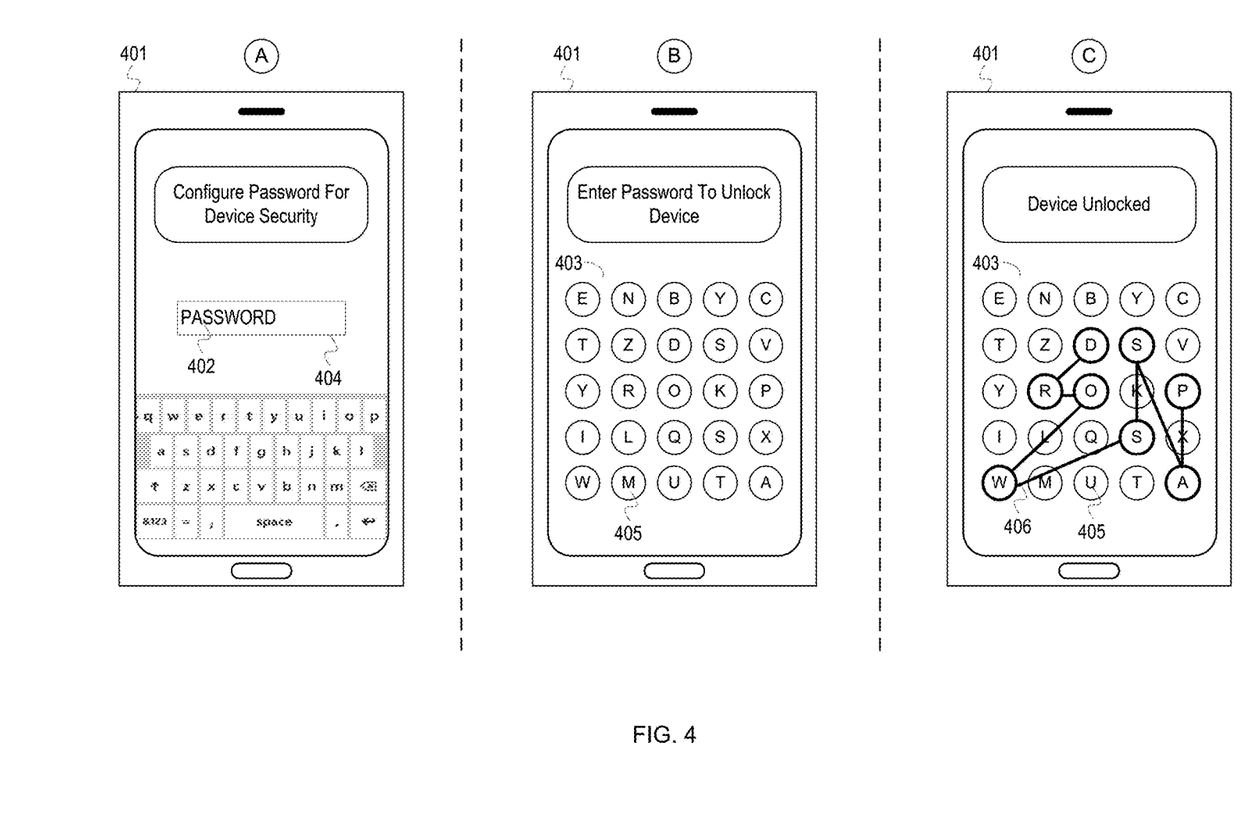
FIG. 4 depicts an example device that implements a scrambled password.

FIG. 4 depicts an example device that implements a scrambled password. FIG. 4 depicts a device 401. The device 401 may be a mobile device such as a phone, tablet, smartwatch, etc. The device 401 includes a touchscreen display or other type of display capable of receiving user input. FIG. 4 is annotated with a series of letters A-C. These letters represent stages of operations. Although these stages are ordered for this example, the stages illustrate one example to aid in understanding this disclosure and should not be used to limit the claims. Subject matter falling within the scope of the claims can vary with respect to the order and some of the operations.

At stage A, the device 401 displays a password field 404 and prompts a user to configure a password 402. The user may enter the password 402 into the password field 404 using a touchscreen keyboard or other input device. In FIG. 4, the user has entered the password 402 "PASSWORD" in the password field 404. The device 401 stores the password 402 in persistent memory or other storage. The device 401 may also check that the password 402 is of a certain strength or length, does not contain invalid characters, etc.

At stage B, the device 401 displays a grid 403 with characters 405. The characters 405 include the alphabetic characters or letters of the password 402. The grid 403 includes twenty-five coordinates that each display one of the alphabetic characters 405. Since the password 402 includes eight characters, the device 401 randomly selects seventeen additional alphabetic characters for the characters 405. In some implementations, the device 401 may select from alphanumeric characters. During the random selection process, the device 401 ensures that none of the selected characters are included in the password 402. As a result, the password 402 can only be formed using predetermined coordinates on the grid 403 and not coordinates which include randomly selected characters. The device 401 randomly distributes the characters 405 throughout the grid 403. For each subsequent unlock attempt, the device 401 scrambles the characters 405 so that they are displayed in different coordinates of the grid 403.

At stage C, the device 401 receives inputs 406 from the user attempting to unlock the device 401 and authenticates the inputs 406. In FIG. 4, the user has correctly selected the password 402 from the characters 405 displayed on the grid 403. The device 401 may authenticate the inputs 406 by comparing the string of characters formed by the inputs 406 to the password 402. Since the string of characters formed by the inputs 406 match the password 402, the device 401 unlocks.

Variations

The flowchart is provided to aid in understanding the illustrations and are not to be used to limit scope of the claims. The flowchart depicts example operations that can vary within the scope of the claims. Additional operations may be performed; fewer operations may be performed; the operations may be performed in parallel; and the operations may be performed in a different order. For example, the operations depicted in blocks 306 and 308 of FIG. 3 can be performed in parallel or concurrently. Additionally, the operations depicted in block 308 may not be performed. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

The description above includes operations that are performed randomly. These operations may be accomplished using a random number generator ("RNG"), such as a traditional RNG or a pseudo RNG. The RNG may be implemented in hardware or software. For example, random numbers may be generated by the RNG algorithmically in software.

The description above describes a pattern that is made up of segments. A pattern may be made up of other elements besides segments, such as two dimensional shapes, three dimensional shapes, arcs, curves, etc. For example, a pattern may be an arrangement of circles. A user may complete the pattern by dragging the circles into the correct areas on a screen. In addition, other attributes of a graphical element can be used as distractions and the distraction factor may not be visible. To illustrate, a pattern password may be defined as a crescent moon shape with 13 ovals of alternating colors between yellow and green. The hint pattern may only include green ovals. The interface presents an element selection panel. In response to taps, the device changes the shape of the graphical element. After selection of a shape, the device changes color of the selected shape. As a distraction, the device can vary the sequence of colors presented. For one access attempt, the color yellow would be presented after 3 taps. In another access attempt, the color yellow is presented after 1 tap. This can mislead a mechanism attempting to misappropriate the pattern password by monitoring the number of taps on the screen. As an additional example, a pattern may include a three dimensional shape such as a cube. A user may unlock a device by rotating or orienting the cube in order to successfully complete the pattern. The cube may be reoriented to a random position for each unlock attempt so that the input required to correctly orient the cube and complete the pattern is different.

The variations described above do not encompass all possible variations, implementations, or embodiments of the present disclosure. Other variations, modifications, additions, and improvements are possible.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium.

A machine readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

Computer program code for carrying out operations for aspects of the disclosure may be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code may execute entirely on a stand-alone machine, may execute in a distributed manner across multiple machines, and may execute on one machine while providing results and or accepting input on another machine.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

Figure 5:
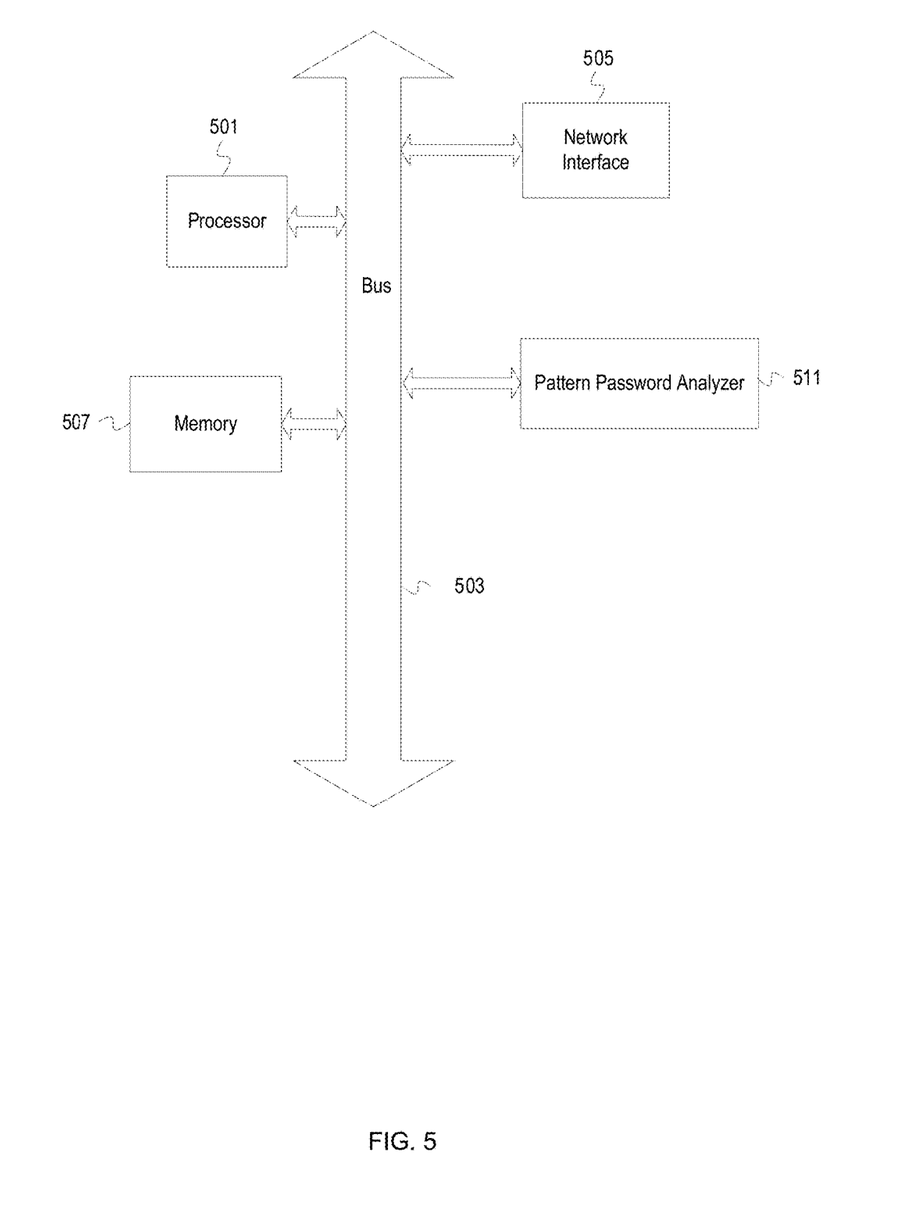
FIG. 5 depicts an example computer system with a pattern password analyzer.

FIG. 5 depicts an example computer system with a pattern password analyzer. The computer system includes a processor 501 (possibly including multiple processors, multiple cores, multiple nodes, and/or implementing multi-threading, etc.). The computer system includes memory 507. The memory 507 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 503 (e.g., PCI, ISA, PCI-Express, HyperTransport® bus, InfiniBand® bus, NuBus, etc.) and a network interface 505 (e.g., a Fiber Channel interface, an Ethernet interface, an internet small computer system interface, SONET interface, wireless interface, etc.). The system also includes a pattern password analyzer 511. The pattern password analyzer 511 allows a pattern password to be established, generates hint patterns based on the pattern password, and authenticates completion attempts of the pattern password. Any one of the previously described functionalities may be partially (or entirely) implemented in hardware and/or on the processor 501. For example, the functionality may be implemented with an application specific integrated circuit, in logic implemented in the processor 501, in a co-processor on a peripheral device or card, etc. Further, realizations may include fewer or additional components not illustrated in FIG. 5 (e.g., video cards, audio cards, additional network interfaces, peripheral devices, etc.). The processor 501 and the network interface 505 are coupled to the bus 503. Although illustrated as being coupled to the bus 503, the memory 507 may be coupled to the processor 501.

While the aspects of the disclosure are described with reference to various implementations and exploitations, it will be understood that these aspects are illustrative and that the scope of the claims is not limited to them. In general, techniques for implementing a pattern password as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

Terminology

The description above uses the term "pattern password." Passwords are typically a series of characters that are used to gain access to a device as described in FIG. 4. A pattern password, however, is a pattern of elements that are used to gain access to a device. As illustrated in FIGS. 1 and 2, a pattern password is not limited to a series or sequence of characters.

What is claimed is:

1. A method comprising:
   storing a graphical pattern for accessing an electronic device based on user input;
   determining a first subset of graphical elements of a plurality of graphical elements, wherein the plurality of graphical elements form the graphical pattern, wherein the first subset of graphical elements comprises a different subset of graphical elements than a second subset of graphical elements of the plurality of graphical elements displayed during a previous attempt to access the electronic device;
displaying the first subset of graphical elements;
receiving, via the electronic device, user input of a third subset of graphical elements;
determining, via the electronic device, whether a combination of the first subset of graphical elements and the third subset of graphical elements form the graphical pattern; and
based on a determination that the first subset of graphical elements and the third subset of graphical elements form the graphical pattern, allowing access to the electronic device.

2. The method of claim 1, wherein determining the first subset of graphical elements comprises:
obtaining first random numbers from a random number generator; and
selecting graphical elements from the plurality of graphical elements which correspond to the first random numbers.

3. The method of claim 2, wherein determining the first subset of graphical elements further comprises:
determining that the selected graphical elements which correspond to the first random numbers are identical to the second subset of graphical elements; and
based on determining that the selected graphical elements are identical to the second subset of graphical elements, obtaining second random numbers from the random number generator; and
selecting graphical elements from the plurality of graphical elements which correspond to the second random numbers.

4. The method of claim 1, wherein a count of the first subset of graphical elements is randomly determined from a range of numbers corresponding to a count of the plurality of graphical elements.

5. The method of claim 1, further comprising, based on a determination that the first subset of graphical elements and the third subset of graphical elements do not form the graphical pattern, determining and displaying a fourth subset of graphical elements of the plurality of graphical elements, which is different than the first subset of graphical elements and the second subset of graphical elements.

6. The method of claim 5, wherein determining the fourth subset of graphical elements comprises determining a first count for the fourth subset of graphical elements to be less than a second count of the first subset of graphical elements.

7. The method of claim 1, further comprising:
determining a distraction graphical element; and
displaying the distraction graphical element with the first subset of graphical elements, wherein the plurality of graphical elements does not comprise the distraction graphical element.

8. The method of claim 7, wherein determining the distraction graphical element comprises selecting the distraction graphical element based, at least in part, on the plurality of graphical elements.

9. The method of claim 8, wherein each graphical element of the plurality of graphical elements comprises a coordinate pair, wherein selecting the distraction graphical element based, at least in part, on the plurality of graphical elements comprises:
selecting a first coordinate from a first graphical element of the plurality of graphical elements and a second coordinate from a second graphical element of the plurality of graphical elements;
wherein the distraction graphical element comprises the first coordinate and the second coordinate.

10. One or more non-transitory machine-readable media having program code, the program code comprising instructions to:
store a graphical pattern for accessing an electronic device based on user input;
determine a first sub-pattern of the graphical pattern, wherein the graphical pattern comprises a plurality of graphical elements, wherein the first sub-pattern is different than a second sub-pattern of the graphical pattern displayed during a previous attempt to access the electronic device;
provide the first sub-pattern for display;
receive, via the electronic device, user input of a third sub-pattern;
determine, via the electronic device, whether a combination of the first sub-pattern and the third sub-pattern form the graphical pattern; and
based on a determination that the first sub-pattern and the third sub-pattern form the graphical pattern, allow access to the electronic device.

11. The machine-readable storage media of claim 10, wherein the instructions to determine the first sub-pattern comprises instructions to:
obtain first random numbers from a random number generator; and
determine the first sub-pattern based, at least in part, on the first random numbers.

12. An apparatus comprising:
a processor; and
a machine-readable medium having program code executable by the processor to cause the apparatus to,
store a graphical pattern for accessing an electronic device based on user input;
determine a first subset of graphical elements of a plurality of graphical elements, wherein the plurality of graphical elements form the graphical pattern, wherein the first subset of graphical elements comprises a different subset of graphical elements than a second subset of graphical elements of the plurality of graphical elements displayed during a previous attempt to access the apparatus;
provide the first subset of graphical elements for display;
receive, via the electronic device, user input of a third subset of graphical elements;
determine, via the electronic device, whether a combination of the first subset of graphical elements and the third subset of graphical elements form the graphical pattern; and
based on a determination that the first subset of graphical elements and the third subset of graphical elements form the graphical pattern, allow access to the apparatus.

13. The apparatus of claim 12, wherein the program code executable by the processor to cause the apparatus to determine the first subset of graphical elements comprises program code executable by the processor to cause the apparatus to:
obtain first random numbers from a random number generator; and
select graphical elements from the plurality of graphical elements which correspond to the first random numbers.

14. The apparatus of claim 13, wherein the program code executable by the processor to cause the apparatus to determine the first subset of graphical elements further comprises program code executable by the processor to cause the apparatus to:
- determine that the selected graphical elements which correspond to the first random numbers are identical to the second subset of graphical elements; and
- based on the determination that the selected graphical elements are identical to the second subset of graphical elements,
  - obtain second random numbers from the random number generator; and
  - select graphical elements from the plurality of graphical elements which correspond to the second random numbers.

15. The apparatus of claim 12, wherein a count of the first subset of graphical elements is randomly determined from a range of numbers corresponding to a count of the plurality of graphical elements.

16. The apparatus of claim 12, further comprising program code executable by the processor to cause the apparatus to, based on a determination that the first subset of graphical elements and the third subset of graphical elements do not form the graphical pattern, determine and display a fourth subset of graphical elements of the plurality of graphical elements, which is different than the first subset of elements and the second subsets of graphical elements.

17. The apparatus of claim 16, wherein the program code executable by the processor to cause the apparatus to determine the fourth subset of graphical elements comprises program code executable by the processor to cause the apparatus to determine a first count for the fourth subset of graphical elements to be less than a second count of the first subset of graphical elements.

18. The apparatus of claim 12, further comprising program code executable by the processor to cause the apparatus to:
- determine a distraction graphical element; and
- display the distraction graphical element with the first subset of graphical elements, wherein the plurality of graphical elements does not comprise the distraction graphical element.

19. The apparatus of claim 18, wherein the program code executable by the processor to cause the apparatus to determine the distraction graphical element comprises program code executable by the processor to cause the apparatus to select the distraction graphical element based, at least in part, on the plurality of graphical elements.

20. The apparatus of claim 19, wherein each graphical element of the plurality of graphical elements is a coordinate pair, wherein the program code executable by the processor to cause the apparatus to select a distraction graphical element based, at least in part, on the plurality of graphical elements comprises:
- selecting a first coordinate from a first graphical element of the plurality of graphical elements and a second coordinate from a second graphical element of the plurality of graphical elements;
- wherein the distraction graphical element comprises the first coordinate and the second coordinate.

* * * * *